US008751511B2

(12) United States Patent
Dong et al.

(10) Patent No.: US 8,751,511 B2
(45) Date of Patent: Jun. 10, 2014

(54) RANKING OF SEARCH RESULTS BASED ON MICROBLOG DATA

(75) Inventors: Anlei Dong, Fremont, CA (US); Pranam Kolari, Santa Clara, CA (US); Ruiqiang Zhang, Cupertino, CA (US); Jing Bai, Santa Clara, CA (US); Yi Chang, Sunnyvale, CA (US); Zhaohui Zheng, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 303 days.

(21) Appl. No.: 12/749,972

(22) Filed: Mar. 30, 2010

(65) Prior Publication Data

US 2011/0246457 A1 Oct. 6, 2011

(51) Int. Cl.
*G06F 7/00* (2006.01)
*G06F 17/30* (2006.01)

(52) U.S. Cl.
USPC .......................................................... 707/749

(58) Field of Classification Search
USPC .......................................................... 707/749
See application file for complete search history.

(56) References Cited

U.S. PATENT DOCUMENTS

| 7,571,106 | B2 * | 8/2009 | Cao et al. ........................ 705/1.1 |
| 8,082,288 | B1 * | 12/2011 | Yeh et al. ....................... 709/200 |
| 2004/0215607 | A1 * | 10/2004 | Travis, Jr. ........................... 707/3 |
| 2005/0144193 | A1 * | 6/2005 | Henzinger ................. 707/103 R |
| 2005/0165753 | A1 * | 7/2005 | Chen et al. ......................... 707/3 |
| 2008/0256046 | A1 * | 10/2008 | Blackman et al. ................ 707/3 |
| 2009/0119268 | A1 * | 5/2009 | Bandaru et al. ................... 707/3 |
| 2009/0276500 | A1 * | 11/2009 | Karmarkar ..................... 709/206 |
| 2011/0087647 | A1 * | 4/2011 | Signorini et al. ............. 707/709 |
| 2011/0178995 | A1 * | 7/2011 | Suchter et al. ................ 707/692 |
| 2011/0295844 | A1 * | 12/2011 | Sun et al. ....................... 707/723 |

OTHER PUBLICATIONS

Agichtein, E. et al., "Improving Web Search Ranking by Incorporating User Behavior Information," Proceedings of the 29th ACM SIGIR Conference Seattle, Washington, 2006, 8 pages.
Borau, K., et al., "Microblogging for Language Learning: Using Twitter to Train Communicative and Cultural Competence," International Conference on Web Based Learning (ICWL) 2009, pp. 78-87.
Brin, S. et al., "The Anatomy of a Large-Scale Hypertextual Web Search Engine," Proceedings of International Conference on World Wide Web, 1998, 26 pages.
Broder, A., "A Taxonomy of Web Search," SIGIR Forum, 36(2), Fall 2002 pp. 3-10.
Burges, C. et al., "Learning to Rank Using Gradient Descent," Proceedings of the 22nd International Conference on Machine Learning, Bonn, Germany, 2005, 8 pages.

(Continued)

*Primary Examiner* — Robert Beausoliel, Jr.
*Assistant Examiner* — Michael Pham
(74) *Attorney, Agent, or Firm* — Pillsbury Winthrop Shaw Pittman LLP

(57) ABSTRACT

An information retrieval system is described herein that monitors a microblog data stream that includes microblog posts to discover and index fresh resources for searching by a search engine. The information retrieval system also uses data from the microblog data stream as well as data obtained from a microblog subscription system to compute novel and effective features for ranking fresh resources which would otherwise have impoverished representations. An embodiment of the present invention advantageously enables a search engine to produce a fresher set of resources and to rank such resources for both relevancy and freshness in a more accurate manner.

22 Claims, 9 Drawing Sheets

(56) References Cited

OTHER PUBLICATIONS

Cao, Z. et al., "Learning to Rank: From Pairwise Approach to Listwise," Proceedings of the 24th International Conference on Machine Learning (ICML), Corvallis, Oregon, 2007, 8 pages.

Diaz, F. "Integration of News Content into Web Results," Proceedings of the Second ACM International Conference on Web Search and Data Mining (WSDM), Barcelona, Spain, 2009, 10 pages.

Dong, A. et al., Towards Recency Ranking in Web Search, Proceedings of the Third ACM International Conference on Web Search and Data Mining (WSDM), New York City, New York, 2010, pp. 11-20.

Dunlap, J. C. et al.,"Tweeting the Night Away: Using Twitter to Enhance Social Presence," Journal of Information Systems Education Special Issue, Impacts of Web 2.0 and Virtual World Technologies on IS Education, 2009, 8 pages.

Freund, Y. et al., "An Efficient Boosting Algorithm for Combining Preferences," Journal of Machine Learning Research 4, 2003, pp. 933-969.

Friedman, J. H. "Greedy Function Approximation: A Gradient Boosting Machine," Annals of Statistics, 29 (5):1189-1232, 2001, 34 pages.

Honeycutt, C. et al., "Beyond Microblogging: Conversation and Collaboration via Twitter," Proceedings of the 42nd Hawaii International Conference on System Sciences (HICSS-42), Los Alamitos, California, 2009, 10 pages.

Huberman, B. A. et al., "Social Networks that Matter: Twitter under the Microscope," Dec. 4, 2008, pp. 1-9.

Hughes, A. L. et al., "Twitter Adoption and Use in Mass Convergence and Emergency Events," Proceedings of the 6th International Conference on Information Systems for Crisis Response and Management, Gothenburg, Sweden, May 2009, 10 pages.

Jansen, B. J. et al., "Twitter Power: Tweets as Electronic Word of Mouth," Journal of the American Society for Information Science and Technology 60(11), 2009, pp. 2169-2188.

Jarvelin, K. et al., "Cumulated Gain-Based Evaluation of IR Techniques", ACM Transactions on Information Systems 20:422-446, 2002, pp. 29.

Java, A. et al., "Why We Twitter: Understanding Microblogging Usage and Communities," Proceedings of the 9th WebKDD and 1st SNA-KDD Aug. 12, 2007 Workshop on Web Mining and Social Network Analysis, San Jose, CA, Aug. 12, 2007, 10 pages.

Joachims, T. "Optimizing Search Engines using Clickthrough Data," Proceedings of the ACM Conference on Knowledge Discovery and Data Mining (KDD), Edmonton, Alberta, Canada, 2002, 10 pages.

Konig, A. C. et al., "Click-through Prediction for News Queries," SIGIR 2009, Boston, Massachusetts, Jul. 19-23, 2009, 8 pages.

Krishnamurthy, B. et al., "A Few Chirps about Twitter", WOSN '08: Proceedings of the First Workshop on Online Social Networks, Seattle, WA, Aug. 18, 2008, 6 pages.

Liu, T. Y. "Learning to Rank for Information Retrieval," Tutorial at WWW Conference, Apr. 20, 2009, 67 pages.

Metzler, D. et al., "Similarity Measures for Short Segments of Text," ECIR, 2007, 12 pages.

Shamma, D. et al., "Tweet the Debates: Understanding Community Annotation of Uncollected Sources," Proceedings of the first SIGMM workshop on Social media, Beijing, China, Oct. 23, 2009, 8 pages.

Wang, X. et al., "Learn from Web Search Logs to Organize Search Results," Proceedings of the 30th ACM SIGIR Conference 2007, Amsterdam, The Netherlands, Jul. 23-27, 2007, 8 pages.

Zhao, D. et al., "How and Why People Twitter: The Role that Micro-Blogging Plays in Informal Communication at Work," GROUP '04, Sanibel Island, Florida, May 10-13, 2009, pp. 243-252.

Zheng, Z. et al., "A Regression Framework for Learning Ranking Functions Using Relative Relevance Judgments," Proceedings of the 30th ACM SIGIR Conference 2007, Amsterdam, The Netherlands, Jul. 23-27, 2007, 8 pages.

Zheng, Z. et al., "A General Boosting Method and its Application to Learning Ranking Functions for Web Search", In Advances in Neural Information Processing Systems, 2007, 8 pages.

\* cited by examiner

400

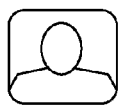
IDIMIC: Google Social Search: Twitter and FriendFeed Highlighted. What About Facebook? http:bit.ly/2o8CYN (expand)
6 days ago from *Tweetie* · Reply · View Tweet

lagrotta: Google Social Search: Twitter and FriendFeed Highlighted. What About Facebook? http:bit.ly/2o8CYN (expand) by @parislemon (via @TechCrunch)
6 days ago from *Twitterrific* · Reply · View Tweet

MJ_axelere: Good : No #Facebook in #Google Social Search since it is NOT PUBLIC and SHARED http:bit.ly/2o8CYN (expand) by @parislemon
6 days ago from *TweetDeck* · Reply · View Tweet

deewang: Google Social Search: Twitter and FriendFeed Highlighted. What About Facebook? http:bit.ly/2o8CYN (expand) by @parislemon (via @TechCrunch)
6 days ago from *Tweetie* · Reply · View Tweet

MyLinguistics: RT @TechCrunch Google Social Search: Twitter and FriendFeed Highlighted. What About Facebook? http:bit.ly/2o8CYN (expand)
6 days ago from *web* · Reply · View Tweet

FIG. 4

RANKING OF SEARCH RESULTS BASED ON MICROBLOG DATA

BACKGROUND OF THE INVENTION

1. Field of the Invention

The present invention generally relates to information retrieval systems and methods. In particular, the present invention relates to information retrieval systems and methods that identify and rank resources in response to a query.

2. Background

Generally speaking, an information retrieval system is an automated system that assists a user in searching for and obtaining access to information. A search engine is one type of information retrieval system. A search engine is designed to help users search for and obtain access to information that is stored in a computer system or across a network of computers. Search engines help to minimize the time required to find information as well the amount of information that must be consulted. The most public, visible form of a search engine is a Web search engine which is designed to search for information on the World Wide Web. Some well-known Web search engines include Yahoo!® Search (www.yahoo.com), provided by Yahoo! Inc. of Sunnyvale, Calif., Bing™ (www.bing.com), provided by Microsoft® Corporation of Redmond, Wash., and Google™ (www.google.com), provided by Google Inc. of Mountain View, Calif.

A search engine provides an interface that enables a user to specify criteria about one or more resources of interest and then operates to find resources that match the specified criteria. The criteria are referred to as a query. In the case of text search engines, the query is typically expressed as a set of words that identify a desired concept to which one or more resources relate. The list of resources identified by a search engine as meeting the criteria specified by the query is typically sorted, or ranked. Ranking resources by relevance (from highest to lowest) reduces the time required to find the desired information.

To provide a set of matching resources that are sorted according to some criteria quickly, some search engines are designed to collect metadata about the group of resources under consideration beforehand and store such metadata in an index. The metadata associated with a resource typically constitutes less information than the full content of the resource itself. Consequently, some search engines only store the indexed information and not the full content of each resource. Such search engines may provide a user with a method of navigating to the actual resources in a search engine results page. Alternatively or additionally, a search engine may store a copy of each resource in a cache so that users can see the state of the resource at the time it was indexed, for archive purposes, or to make repetitive processes work more efficiently and quickly.

Web search engines serve a wide spectrum of user information needs. These include, for example, handling navigational queries (e.g., queries such as "yahoo" that refer to a destination on the Web) and transactional queries (e.g., queries such as "red shoes" that refer to a product or service in which a user is interested) amongst other query classes. Although the different classes of information needs constitute varying sizes of the total queries issued to a Web search engine, an effective system will support each.

Recency-sensitive queries refer to queries where the user expects resources that are both topically relevant as well as fresh. For example, consider the occurrence of some natural disaster such as an earthquake. A user interested in this topic desires resources that are both relevant and fresh. For example, a relevant resource may be a document that discusses the earthquake while a fresh resource may be a document that provides novel information about the earthquake.

A Web search engine must effectively retrieve resources for recency-sensitive queries because failures can be more severe than with other query classes. First, the desire for information is immediate. A user searching for recent information might only want an update on a topic. The user might also have just heard of an event (e.g., a death) and be less willing to reformulate a query or scan a ranked list for relevant resources. Second, time sensitive queries are more likely to suffer from what is referred to as the zero recall problem. Time sensitive queries often refer to events for which resources have not yet been published or have been lightly published. Because the resource metadata indexed by Web search engines is typically derived from content fetched by a Web crawler, the freshness of the resources represented in the index will depend upon the crawl policy. Zero recall queries are detrimental because no amount of user effort—through reformulation or scanning—can find the relevant resources. In order to avoid catastrophic failures for recency-sensitive queries, a search engine needs not just an effective model of which queries are recency-sensitive but also algorithms for effectively retrieving fresh resources.

Even if a search engine were capable of retrieving fresh resources, such resources typically do not have highly effective features relating to long-term popularity and usage that can be used for ranking such as in-link statistics, Web page rank, click-based statistics, or the like. Thus, some method must also be provided for computing novel and effective features for ranking fresh resources which otherwise will have impoverished representations.

BRIEF SUMMARY OF THE INVENTION

An information retrieval system is described herein that monitors a microblog data stream that includes microblog posts to discover and index fresh resources for searching by a search engine. The information retrieval system also uses data from the microblog data stream as well as data obtained from a microblog subscription system to compute novel and effective features for ranking fresh resources which would otherwise have impoverished representations. An embodiment of the present invention advantageously enables a search engine to produce a fresher set of resources and to rank such resources for both relevancy and freshness in a more accurate manner.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 4 depicts a set of microblog posts from different microblog users concerning a common uniform resource locator (URL).

Figure 1:
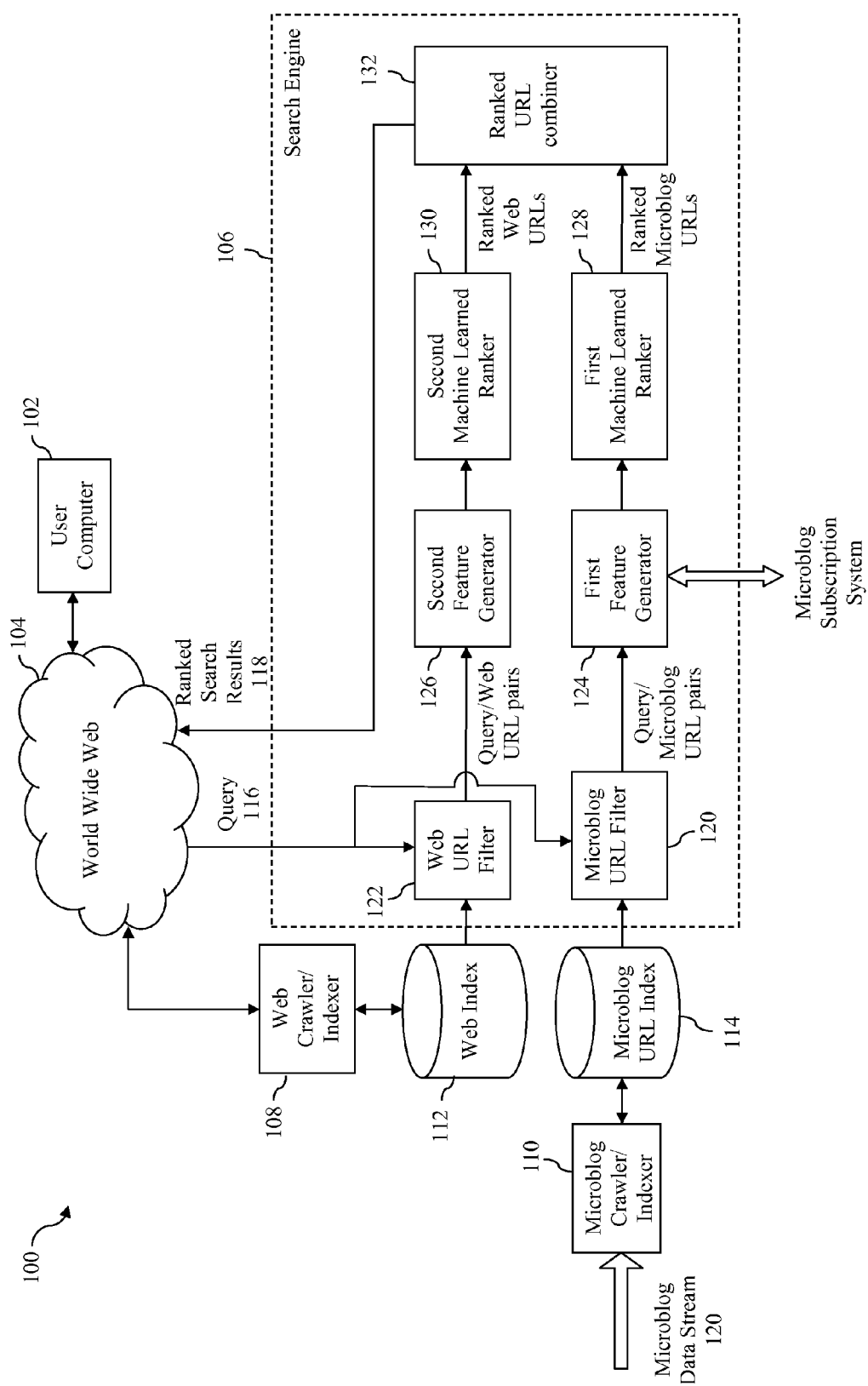
FIG. 1 is a block diagram of an example information retrieval system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

In accordance with embodiments of the present invention, information from a microblogging system is exploited to improve search engine performance, particularly for recency-sensitive queries. As used herein, the term "microblogging" refers to a Web publishing system in which user posts are severely constrained in size. For example, TWITTER (www.twitter.com) is a microblog that limits posts to no more than 140 characters. These constraints allow rapid publishing from a variety of interfaces (e.g., laptop, SMS) and encourage real-time updates and links on developing topics. Other examples of microblogging systems include those provided by TUMBLR, PLURK, EMOTE.IN, SQUEELR, BEEING, JAIKU and IDENTI.CA. Certain social networking websites such as those published by FACEBOOK, MYSPACE, LINKEDIN and XING also provide a microblogging feature, which is sometimes referred to as "status updates." The concepts described herein may advantageously be implemented using data produced by any microblogging system, including but not limited to those referenced above.

As will be described herein, an embodiment of the present invention beneficially leverages the following findings: (1) that microblog posts are likely to contain resource identifiers, such as Uniform Resource Locators (URLs), of important documents that have not yet been indexed by a search engine via conventional Web crawling; (2) that documents linked to from a microblog post may be relevant to recency-sensitive queries; (3) that the text of microblog posts can be used to expand the text representation of resources that are used in performing a resource search; and (4) that aspects of a social network associated with a microblogging service can be used to improve the ranking of search results.

An embodiment of the present invention leverages such findings by monitoring a real-time data stream of microblog posts to discover and index fresh resource identifiers included in such posts so that the resource identifiers will be available for searching by a search engine. The search engine can thus return fresh resources associated with such resource identifiers in response to queries, such as recency-sensitive queries. The fresh resources may be returned in the context of a general search results page that also includes resources indexed via conventional Web crawling. In accordance with such an embodiment, the user can obtain access to the fresh resources without having to be exposed to the microblog content through which such resources were identified.

An embodiment of the present invention also leverages such finding by using data from the real-time data stream as well as data obtained from a microblog subscription system to compute novel and effective features for ranking fresh resources which would otherwise have impoverished representations.

B. Example Information Retrieval System and Method

1. Example System Architecture

FIG. 1 is a block diagram of an example information retrieval system 100 in accordance with an embodiment of the present invention. As shown in FIG. 1, system 100 comprises a plurality of elements including a user computer 102 and a search engine 106 that are communicatively connected to each other via World Wide Web 104. Although communication between user computer 102 and search engine 106 is carried out across World Wide Web 104, persons skilled in the relevant art will readily appreciate that, in accordance with other embodiments, such communication may take place across other types of networks and communication links.

User computer 102 is intended to broadly represent any system or device that is capable of interacting with a search engine. In certain embodiments, user computer 102 comprises a processor-based system or device that executes a Web browser or other software that enables a user to submit queries to and receive search results from search engine 106. Depending upon the implementation, such system or device may comprise, for example, a desktop computer system, a laptop computer, a tablet computer, a gaming console, a personal digital assistant, a smart telephone, a portable media player, or the like. Although only one user computer 102 is shown in FIG. 1 for the sake of simplicity, it is to be appreciated that any number of user computers, including hundreds, thousands, or even millions of user computers, may interact with search engine 106 via World Wide Web 104.

Search engine 106 comprises a system that is designed to help users, such as a user of user computer 102, search for and obtain access to resources that are stored at a multitude of different interconnected nodes within World Wide Web 104. Such resources may include, for example, Web pages, text files, audio files, image files, video files, or the like. Search engine 106 may comprise, for example, a publicly-available Web search engine such as Yahoo!® Search (www.yahoo.com), provided by Yahoo! Inc. of Sunnyvale, Calif., Bing™ (www-.bing.com), provided by Microsoft® Corporation of Redmond, Wash., and Google™ (www.google.com), provided by Google Inc. of Mountain View, Calif.

Search engine 106 provides an interface that enables a user of user computer 102 to submit a query 116 that relates to one or more resources of interest. Query 116 may comprise, for example, a text query comprising one or more query terms. Responsive to receiving query 116, search engine 106 executes a search to identify resources on World Wide Web 104 that are deemed relevant to query 116, ranks the identified resources in accordance with a ranking scheme that will be described in more detail herein, and then returns ranked search results 118 to the user via user computer 102, wherein ranked search results 118 comprises a ranked list of the identified resources. In one embodiment, for each identified resource, ranked search results 118 includes a unique identifier of the resource, a title associated with the resource, and a short summary that briefly describes the resource. The unique identifier of the resource may comprise, for example, a Uniform Resource Locator (URL). The URL may be provided in the form of a link that, when activated by a user, causes user computer 102 to retrieve the associated resource from a node within World Wide Web 104.

To support the functions of search engine 106, system 100 includes a Web crawler/indexer 108 and a microblog crawler/indexer 110. Web crawler/indexer 108 comprises a computer-implemented system that periodically browses nodes of World Wide Web 104 to obtain up-to-date information about resources stored on such nodes. Web crawler/indexer 108 stores the information about such resources in a Web index 112. The indexed information about each resource includes a unique identifier of the resource, which as noted above may comprise a URL associated with the resource. Web crawler/indexer 108 may be implemented by a large number of computers operating in parallel in order to efficiently crawl and index the large number of resources included within World Wide Web 104. The use of a Web crawler/indexer to obtain and index information about resources available on World Wide Web 104 is well-known in the art.

Microblog crawler/indexer 110 is a computer-implemented system that monitors a microblog data stream 120 that is received from a microblog publishing system (not shown in FIG. 1). In an embodiment, microblog data stream 120 comprises a real-time feed of posts issued by users of the microblogging system and metadata associated with such posts. Such posts may comprise, for example, short text messages that optionally include embedded content. For example, certain microblogging systems enable users thereof to include resource identifiers, such as URLs, within a post. To achieve brevity, such URLs may be provided in a shortened form such as that provided by TINYURL or some other URL shortening service.

Microblog crawler/indexer 110 monitors the posts included in microblog data stream 120 and identifies URLs included in such posts. Microblog crawler/indexer 110 then selectively extracts certain ones of the identified URLs and information associated therewith and indexes the selected URLs in microblog URL index 114. The information associated with a URL that may be stored along with the URL in microblog URL index 114 may include, for example, the text of posts that include or refer to the URL and/or metadata associated with each such post. One manner by which microblog crawler/indexer 110 selects URLs from microblog data stream 120 for indexing in microblog URL index 114 will be described in more detail herein.

As further shown in FIG. 1, search engine 106 includes a plurality of interconnected components including a microblog URL filter 120, a Web URL filter 122, a first feature generator 124, a second feature generator 126, a first machine learned ranker 128, a second machine learned ranker 130 and a ranked URL combiner 132. The function of each of these components will now be briefly described.

Web URL filter 122 is configured to receive query 116 submitted by the user of user computer 102 and to employ a matching algorithm to identify resources indexed in Web index 112 that are relevant to the query. Web URL filter 122 couples a URL that is associated with each resource identified by the matching algorithm (hereinafter referred to as a "Web URL") with query 116 to produce a plurality of query/Web URL pairs. Web URL filter 122 then provides each query/Web URL pair to second feature generator 126.

Figure 2:
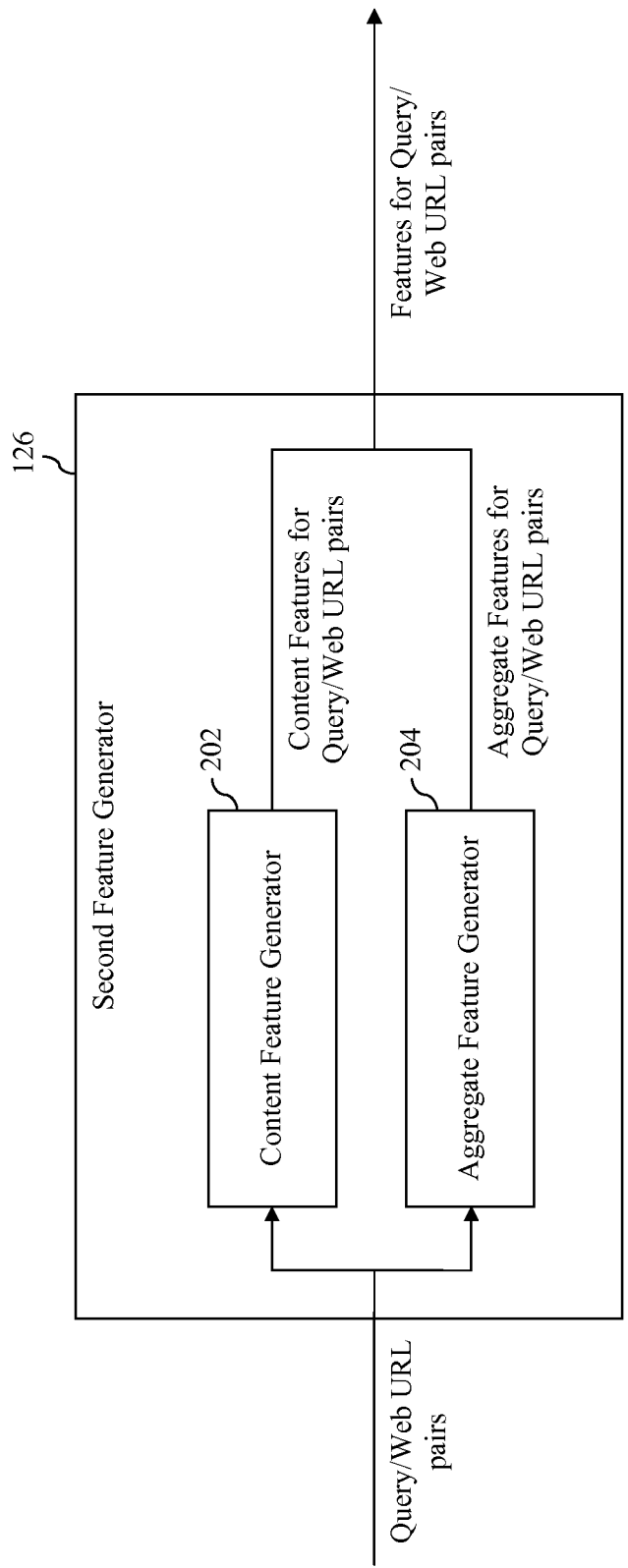
FIG. 2 is a block diagram that depicts an example implementation of a second feature generator shown in FIG. 1.

Second feature generator 126 is configured to generate a set of features for each query/Web URL pair produced by Web URL filter 122. The features generated by second feature generator 126 comprise features that will subsequently be used by second machine learned ranker 130 to rank the resources identified by the Web URLs in the query/Web URL pairs. FIG. 2 is a block diagram that depicts an example implementation of second feature generator 126 in accordance with one embodiment. As shown in FIG. 2, second feature generator 126 includes a content feature generator 202 and an aggregate feature generator 204.

Content feature generator 202 is configured to generate one or more content features for each query/Web URL pair produced by Web URL filter 122. As used herein, the term "content features" refers to features that are a function of the content of a resource, such as a Web page, with respect to a query. For example, content features may include measures or indicators of the degree to which the terms of a query match the content of a resource, measures or indicators of the proximity between query terms within the content of a resource, or the like. Content features are useful for measuring the relevance of a particular resource to a particular query.

Aggregate feature generator 204 is configured to generate one or more aggregate features for each query/Web URL pair produced by Web URL filter 122. As used herein, the term "aggregate features" refers to features that represent or measure a resource's long-term popularity and usage. For example, aggregate features may include in-link statistics associated with a resource (e.g., statistics relating to a number of Web pages that provide links to the resource), a Web page rank that provides a relative measure of the centrality of a Web page within World Wide Web 104, click-based statistics (e.g., statistics relating to a number of users that clicked through to a particular resource), or the like. Aggregate features are useful for measuring the authoritativeness of a particular resource.

Specific non-limiting examples of content features and aggregate features can be found in: Manning et al., Introduction to Information Retrieval, Cambridge University, 2008; Zheng et al., A Regression Framework for Learning Ranking Functions Using Relative Relevance Judgments, Proceedings of the 30th ACM SIGIR Conference, 2007; and Agichtein et al., Improving Web Search Ranking by Incorporating User Behavior Information, Proceedings of the 29th ACM SIGIR Conference, 2006. Each of these documents is incorporated by reference herein.

Second machine learned ranker 130 is configured to automatically construct a ranking function that optimizes retrieval performance metrics. Optimization may be formulated as learning a ranking function from preference data in order to minimize a loss function (e.g., a number of incorrectly ordered resource pairs in a collection of training data). Various machine learned ranker algorithms that are known in the art may be used to implement second machine learned ranker 130. For example, any of RankSVM (described by Joachims in Optimizing Search Engines Using Clickthrough Data, Proceedings of the ACM Conference on Knowledge Discovery and Data Mining, 2002, the entirety of which is incorporated by reference herein), RankBoost (described by Freund et al. in An Efficient Boosting Algorithm for Combining Preferences, Proceedings of International Conference on Machine Learning, 1998, the entirety of which is incorporated by reference herein), GBRank (described by Z. Zheng et al. in A Regression Framework for Learning Ranking Functions Using Relative Relevance Judgments, Proceedings of the 30$^{th}$ ACM SIGIR Conference, 2007, the entirety of which is incorporated by reference herein), or RankNet (described by C. Burges et al. in Learning to Rank Using Gradient Descent, Proceedings of International Conference on Machine Learning, 2005, the entirety of which is incorporated by reference herein) may be used. Each of the foregoing algorithms cast the preference learning problem from different points of view. For example, RankSVM uses support vector machines; RankBoost applies the idea of boosting from weak learners; Gbrank uses gradient boosting with decision tree; and RankNet uses gradient boosting.

In order to perform its intended function, second machine learned ranker 130 must be trained using some editorially labeled data. In an embodiment, this is accomplished by sampling a set of query/Web URL pairs for human judgment. Each of the query/Web URL pairs is then represented by a set of features that consists of both content features and aggregate features as described above. Using the features of each resource associated with a query/Web URL pair as well as the editorially-labeled training data, second machine learned ranker 130 can predict effective rankings for queries unseen in the training data. A process by which second machine learned ranker 130 can be trained will be described in further detail herein with respect to FIG. 5.

Second machine learned ranker 130 receives each of the query/Web URL pairs produced by Web URL filter 122 and the set of features generated for each by second feature generator 126. Using this information, second machine learned ranker 130 assigns a ranking to each resource associated with each query/Web URL pair. Second machine learned ranker 130 then outputs a ranked list of the Web URLs to ranked URL combiner 132.

Microblog URL filter 120 is configured to receive query 116 submitted by the user of user computer 102 and to employ a matching algorithm to identify URLs indexed in microblog URL index 114 that are relevant to the query. Microblog URL filter 120 couples each URL identified by the matching algorithm (hereinafter referred to as a "microblog URL") with query 116 to produce a plurality of query/microblog URL pairs. Microblog URL filter 120 then provides each query/microblog URL pair to first feature generator 124.

Figure 3:
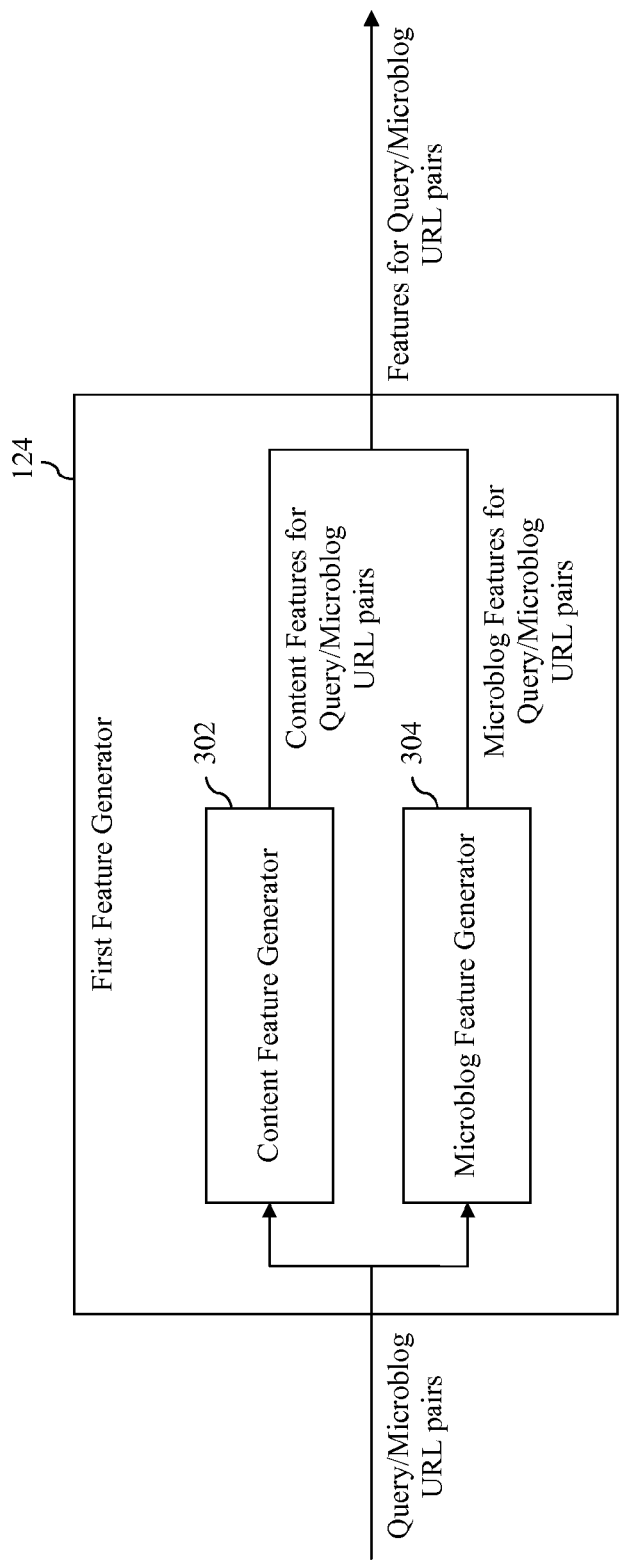
FIG. 3 is a block diagram that depicts an example implementation of a first feature generator shown in FIG. 1.

First feature generator 124 is configured to generate a set of features for each query/microblog URL pair produced by microblog URL filter 120. The features generated by first feature generator 124 comprise features that will subsequently be used by first machine learned ranker 128 to rank the resources identified by the microblog URLs in the query/microblog URL pairs. FIG. 3 is a block diagram that depicts an example implementation of first feature generator 124 in accordance with one embodiment. As shown in FIG. 3, first feature generator 124 includes a content feature generator 302 and a microblog feature generator 304.

Content feature generator 302 is configured to generate one or more content features for each query/microblog URL pair produced by microblog URL filter 120. As noted above, the term "content features" refers to features that are a function of the content of a resource, such as a Web page, with respect to a query. In this case, the content features are features that are a function of the content of a resource identified by a microblog URL with respect to query 116. Content feature generator 302 may operate to generate the same set of content features as content feature generator 202 as described above in reference to FIG. 2 or may operate to generate a different set of content features.

Microblog feature generator 304 is configured to generate one or more microblog features for each query/microblog URL produced by microblog URL filter 120. As used herein, the term "microblog features" refers to features that measure the relevance or authoritativeness of a resource identified by a microblog URL based on data obtained from microblog data stream 120 or from a microblog subscription system. Such microblog features may include, for example, textual features and/or social networking features. The textual features may be obtained, for example, by analyzing the text of one or more microblog posts that refer to a microblog URL in conjunction with a query. Such textual features may be useful in determining the relevance of a resource identified by a microblog URL with respect to a query. The social networking features may be obtained by analyzing one or more characteristics associated with one or more microblog users that issued or received the microblog URL via the microblog. As will be discussed in more detail herein, the characteristics may be obtained from or derived from information obtained from a microblog subscription system (not shown in FIG. 1). The microblog subscription system may be accessed by first feature generator 124 via World Wide Web 104 or some other communication channel. Such information may be obtained in real-time or periodically obtained and stored in a database or other storage medium accessible by first feature generator 124. Particular examples of microblog features will be provided in a subsequent section.

As can be seen from the foregoing, first feature generator 124 does not generate aggregate features for query/microblog URL pairs. This is because it is to be expected that such features, which relate to a resource's long term popularity and usage, will be poorly represented for fresh URLs extracted from microblog data stream 120. Conversely, it is to be expected that microblog features would be poorly represented—or even non-existent—for resources indexed in Web index 112. Thus, second feature generator 126 does not generate microblog features for query/Web URL pairs.

Like second machine learned ranker 130, first machine learned ranker 128 is configured to automatically construct a ranking function that optimizes retrieval performance metrics. As noted above, various machine learned ranker algorithms are known in the art and any of these algorithms may be used to implement first machine learned ranker 128. First machine learned ranker 128 can be implemented using the same machine learned ranker algorithm as second machine learned ranker 130 or some other machine learned ranker algorithm.

In order to perform its intended function, first machine learned ranker 128 must be trained using some editorially labeled data. In an embodiment, this is accomplished by sampling a set of query/microblog URL pairs for human judgment. Each of the query/microblog URL pairs is then represented by a set of features that consists of both content features and microblog features as described above. Using the features associated with each query/microblog URL pair as well as the editorially-labeled training data, first machine learned ranker 128 can predict effective rankings for queries unseen in the training data. A process by which first machine learned ranker 128 can be trained will be described in further detail herein with respect to FIG. 6.

First machine learned ranker 128 receives each of the query/microblog URL pairs produced by microblog URL filter 120 and the set of features generated for each by first feature generator 124. Using this information, first machine learned ranker 128 assigns a ranking to each resource associated with each query/microblog URL pair. First machine learned ranker 128 then outputs a ranked list of the microblog URLs to ranked URL combiner 132.

Ranked URL combiner 132 is configured to receive a ranked listing of microblog URLs from first machine learned ranker 128 and a ranked listing of Web URLs from second machine learned ranker 130 and to combine the ranked listings to create a single ranked listing of URLs. To facilitate this operation, first machine learned ranker 128 and second machine learned ranker 130 may be configured to utilize the same relevancy scoring metric such that a simple sorting routine can be used to combine the ranked listings. For example, in one embodiment, first machine learned ranker 128 and second machine learned ranker 130 are each configured to assign relevance grades of perfect, excellent, good, fair and bad to URLs. Consequently, the prediction scores generated by the two ranking functions are at the same level. In accordance with such an embodiment, ranked URL combiner 132 can directly blend Web URLs and microblog URLs by their ranking scores. Alternatively, ranked URL combiner 132 may be configured to calibrate the ranking scores associated with microblog URLs onto the ranking scores associated with Web URLs, or vice versa, to achieve URL blending.

Each of the foregoing components of search engine 106 may be implemented as computer software executing on one or more servers or other processor-based computing systems or devices. As will be appreciated by persons skilled in the relevant art(s), multiple instantiations of various components of search engine 106 may be executed in parallel on corresponding servers in order to efficiently search and rank resources identified from among a large amount of indexed data.

2. Example Microblog Features

Particular examples of microblog features will now be provided. In accordance with system 100 described above in reference to FIG. 1, such microblog features may be generated for query/microblog URL pairs as part of a training process for first machine learned ranker 128 and may also be generated by first feature generator 124 and provided to first machine learned ranker 128 to allow first machine learned ranker 128 to perform its ranking function.

a. Textual Features

As noted above, microblog data stream 120 comprises a real-time feed of posts issued by users of the microblogging system and metadata associated with such posts. Such data stream may be received from a publishing system associated with a microblog. A resource identifier, such as a URL, may be embedded in a post. A URL posted in such a manner can be associated with the text surrounding it. For example, FIG. 4 depicts a set 400 of microblog posts from users about a common tiny URL (i.e., a URL shortened using the TINYURL service mentioned above). In this particular example, the common tiny URL is http://bit.ly/2o8CYN. It has been observed that the text in microblog posts accompanying a regular or shortened URL can provide useful information for identifying and ranking resources.

Assume that one has collected m microblog posts and w URLs. Let M be the m×w binary matrix representing the occurrence of a URL in a microblog post. Further assume that one has observed v words in all the microblog posts. A m×v matrix D can be defined such that $D_{ij}$ the number of times a microblog post i contains a term j. In one particular approach, stop words are removed from the vocabulary. A vector for a URL, j, can then be constructed in accordance with:

$$u_j^T = \sum_i M_{ij} D_{i\cdot} \qquad (1)$$

where $D_{i\cdot}$ represents row i of D. This represents a URL by the combination of microblog post contents. A query can also be represented by the v×1 vector, q, of term occurrences. These representations allow text similarity features to be used in order to predict URL relevance. For example, the cosine similarity between the URL term vector (Equation 1) and q can be used to determine the similarity between a URL and a query. For a URL, j, the cosine similarity feature is defined as, $$\phi_{cosine}^j = \frac{u_j^T q}{\|u_j\|_2 \|q\|_2} \qquad (2)$$

By design, microblog posts are very short pieces of text and therefore are susceptible to problems when applying classic text ranking methods. For example, unmatched terms should be more severely penalized than they are in cosine similarity. For this reason, the term overlap may also be inspected as another textual feature. Let $\tilde{D}$ be the binary version of D (i.e., $\tilde{D}_{ij}=1$ if $D_{ij}>0$; $\tilde{D}=0$ otherwise). Define $\tilde{q}$ similarly. The term overlap between a query and the text of a microblog post can be represented as,

| | |
|---|---|
| $\omega_{iq} = (\tilde{D}_{i\cdot})^T \tilde{q}$ | overlapping terms |
| $\epsilon_{iq} = \|\tilde{D}_{i\cdot}\|_1 - \omega_{iq}$ | extra terms |
| $\mu_{iq} = \|\tilde{q}\|_1 - \omega_{iq}$ | missing terms | where $\|x\|_1$ is the $l_1$ norm of x. For a candidate URL j, the unit match feature is defined as, $$\phi_{unit}^j = \frac{1}{\|q\|_1} \sum_{i=1}^{m} \varepsilon_{iq}^\alpha \mu_{iq}^\beta \omega_{iq} M_{ij} \qquad (3)$$

The parameters α and β control the importance of extra and missing terms. In certain embodiments, parameters α and β are set to be 0.5 and 0.65 respectively.

A simple exact match feature may also be included. This feature counts the number of microblog posts in which all query tokens appear contiguously, and in the same order, $$\phi_{exact}^j = \frac{1}{\|M_{\cdot j}\|_1} \sum_{i=1}^m phraseMatch(q, i) M_{ij} \quad (4)$$

where $M_{\cdot j}$ returns column j of M and phraseMatch(q,i) returns one if the exact phrase q occurs in tweet i.

The foregoing provides merely a few examples of some microblog-based textual features that may be generated in accordance with embodiments of the present invention. Persons skilled in the relevant art(s) will readily appreciate that other types of textual features not described herein may be obtained by analyzing the text of one or more microblog posts that refer to a microblog URL in conjunction with a query.

b. Social Network Features

As noted above, a microblog may expose a subscription system that can be queried to obtain information about microblog users and their interrelationships. For example, such a subscription system may be queried to determine which microblog users subscribe to the posts of various other microblog users. A first microblog user who subscribes to posts of a second microblog user may be termed the "follower" of the second microblog user. Information obtained from such a subscription system can advantageously be used to measure the quality of microblog URLs obtained from microblog data stream 120.

In accordance with one embodiment, a convention is adopted that represents user information obtained from a microblog subscription system as a social network where vertices represent microblog users and edges represent the follower relationship between them. Mathematically, this graph can be represented as a m×m adjacency matrix, W, where $W_{ij}=1$ if user i follows user j. In practice, W can be normalized so that $\Sigma_j W_{ij}=1$. Given this matrix and an eigensystem, $W\pi=\lambda\pi$, the eigenvector, $\pi$, associated with the largest eigenvalue, $\lambda$, provides a natural measure of the centrality of the microblog user. An analogous concept in Web search is the PageRank of a document. This eigenvector, $\pi$, can be computed using power iteration, $$\pi_{t+1} = (\lambda W + (1-\lambda)U)\pi_t \quad (5)$$

where U is a matrix whose entries are all $$\frac{1}{m}.$$

The interpolation of W with U ensures that the stationary solution, $\pi$, exists. The interpolation parameter, $\lambda$, is set to 0.85 in accordance with one implementation. In one embodiment, fifteen iterations are performed (i.e., $\tilde{\pi}=\pi_{15}$).

In one embodiment of system 100 of FIG. 1, microblog data stream 120 lacks follower relationship data. Thus, in accordance with such an embodiment, a large scale crawl of the microblog subscription system is performed to capture this relationship. In one experiment, in which $\tilde{\pi}$ was computed for ten million users of the microblog TWITTER, it was determined that, although the top microblog users are largely dominated by celebrities, many popular bloggers, and news sources are also surfaced as highly authoritative. If one assumes that a user i posted microblog post k, the authority feature of tweet k may be defined as $$\phi_{authority}^k = \tilde{\pi}_i \quad (6)$$

The authority of the user can also be used in the computation of a unit match score, as previously discussed in reference to Equation 3. In particular, the authority-weighted unit match score can be defined as $$\phi_{unit-\pi}^j = \frac{1}{\|q\|_1} \sum_{i=1}^m \varepsilon_{iq}^\alpha \mu_{iq}^\beta \omega_{iq} M_{ij} \phi_{authority}^j. \quad (7)$$

c. Other Microblog Features

In addition to the microblog features described in the preceding sections, other microblog features may be computed including simple aggregated metrics relating to the microblog URL over a period of time. Examples of such other features are provided below in Table 1. In Table 1, the term "microblog rank" refers to a measure of centrality of the microblog user as discussed in the preceding section regarding social network features. The term "followers" refers to microblog users that subscribe to posts issued by a particular microblog user while the term "followings" refers to the subscriptions of a particular microblog user to the posts of others. The "re-issuing" of a post refers to a feature provide by some microblogging systems by which a microblog user can pass a post received from one microblog user on to one or more other microblog users.

TABLE 1

Other Microblog Features

| | |
|---|---|
| $\phi_{other-1}$ | average number of followers of the microblog users that issued the microblog URL |
| $\phi_{other-2}$ | average number of posts for the microblog users that issued the microblog URL |
| $\phi_{other-3}$ | average number of microblog users who replied to those microblog users who issued the microblog URL |
| $\phi_{other-4}$ | average number of microblog users who replied to those microblog users who issued the microblog URL |
| $\phi_{other-5}$ | average number of followings for the microblog users who issued the microblog URL |
| $\phi_{other-6}$ | average microblog rank of all the users who issued the microblog URL |
| $\phi_{other-7}$ | number of followers of the microblog user who first issued the microblog URL |
| $\phi_{other-8}$ | number of posts by the microblog user who first issued the microblog URL |
| $\phi_{other-9}$ | number of users who re-issued the microblog URL to the microblog user who first issued the microblog URL |
| $\phi_{other-10}$ | number of microblog users who replied to the microblog user who first issued the microblog URL |
| $\phi_{other-11}$ | number of followings for the microblog user who first issued the microblog URL |
| $\phi_{other-12}$ | microblog rank of the microblog users who first issued the microblog URL |
| $\phi_{other-13}$ | number of followers of the microblog user who issued the microblog URL with the maximal microblog rank |
| $\phi_{other-14}$ | number of posts by the microblog user who issued the microblog URL with the maximal microblog rank |
| $\phi_{other-15}$ | number of microblog users who re-issued the microblog URL to the user who issued the microblog URL and has the maximal microblog rank |
| $\phi_{other-16}$ | number of microblog users who replied to the microblog user who issued the microblog URL and has the maximal microblog rank |
| $\phi_{other-17}$ | number of followings for the user who has the highest microblog rank among the users that issued the microblog URL |
| $\phi_{other-18}$ | microblog rank of the users who issued the microblog URL and who is the maximal microblog rank |
| $\phi_{other-19}$ | number of different users who issued the microblog URL |

Some of the features in Table 1 are designed to improve relevance ranking by incorporating microblog specific features, such as microblog user authority based on microblog rank. For example, the feature $\phi_{other-6}$ describes the average microblog rank of all the microblog users who issued the microblog URL. Over a period of time, there could be many users who issued, replied, or re-issued the microblog URL. This feature is generated by calculate the average microblog rank of all such users. The feature $\phi_{other-12}$ is the microblog rank of the microblog users who first issued the microblog URL. This feature cares about the first microblog user who issued the microblog URL.

The foregoing provides merely a few examples of some microblog-based features that may be generated in accordance with embodiments of the present invention. Persons skilled in the relevant art(s) will readily appreciate that other types of microblog-based features not described herein may be obtained. For example, other types of social network features may be generated by analyzing one or more characteristics associated with one or more microblog users that issued or received the microblog URL via the microblog.

3. Example Training Methods

Figure 5:
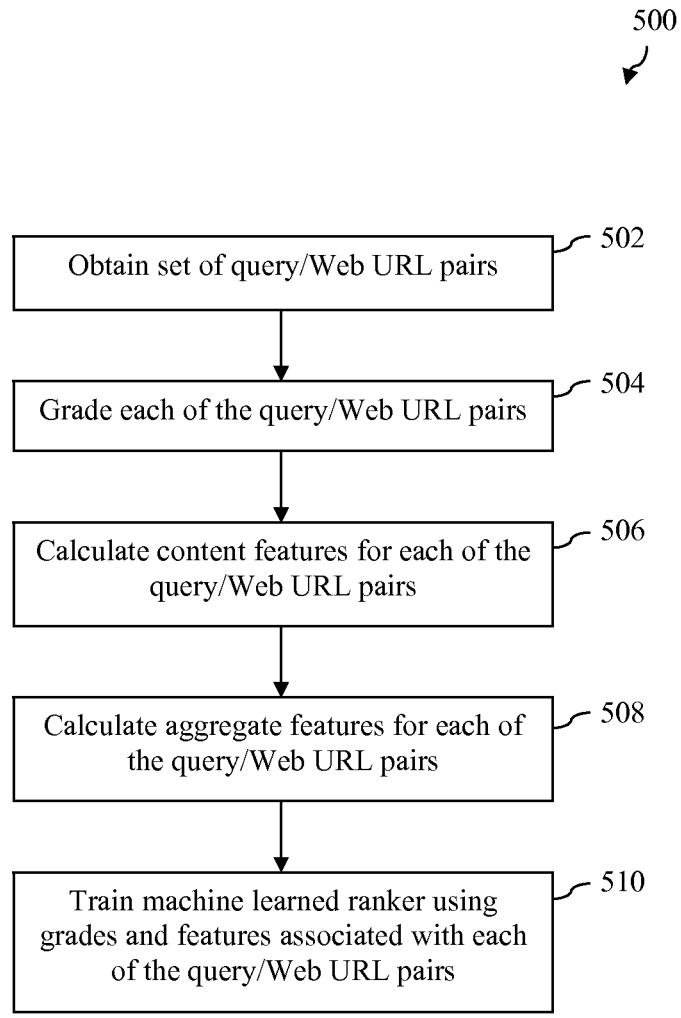
FIG. 5 depicts a flowchart of a first method for training a machine learned ranker used for ranking resources in accordance with an embodiment of the present invention.

FIG. 5 depicts a flowchart 500 of a first method for training a machine learned ranker used for ranking resources in accordance with an embodiment of the present invention. The method of flowchart 500 is particularly suitable for training a machine learned ranker, such as second machine learned ranker 130 of FIG. 1, which is used to rank resources obtained from an index built via Web crawling, such as Web index 112. Although aspects of the method of flowchart 500 will be described herein with continued reference to system 100 of FIG. 1, persons skilled in the relevant art(s) will appreciate that the method is not limited to that implementation.

As shown in FIG. 5, the method of flowchart 500 begins at step 502 in which a set of query/Web URL pairs are obtained. Such query/Web URL pairs may be obtained, for example, by sampling a set of queries submitted to search engine 106 over a predetermined time period and then, for each query so obtained, applying an algorithm to identify resources indexed in Web index 112 that are relevant to the query. The algorithm applied may comprise, for example, some pre-existing relevancy ranking algorithm. However, this is only an example and numerous other methods may be used to obtain a suitable set of query/Web URL pairs.

At step 504, each of the query/Web URL pairs is given a grade by a human editor based on the perceived degree of relevance. In one embodiment, one of five judgment grades may be applied to a query/Web URL pair: perfect, excellent, good, fair and bad.

Certain embodiments of the present invention may be used to improve search results returned in response to queries that are deemed to be recency-sensitive queries. For example, concepts described in the present application may advantageously be applied to improve the performance of a system such as that described in commonly-owned, co-pending U.S. patent application Ser. No. 12/579,855 to Anlei Dong et al., entitled "Incorporating Recency in Network Search Using Machine Learning" and filed on Oct. 15, 2009 (the entirety of which is incorporated by reference herein). In accordance with such embodiments, each query/URL pair may also be associated with a time $t_{query}$ that the query was issued to or received at search engine 106, such that tuples of the form <query, URL, $t_{query}$> are graded. In further accordance with such an embodiment, each tuple may be graded for both temporal and non-temporal relevance. Exemplary aspects of non-temporal relevance that may be graded for include intent, usefulness, content, user interface design and domain authority. However, these aspects of non-temporal relevance are provided by way of example only and are not intended to be limiting.

In order to account for temporal relevance in accordance with one embodiment, resources are categorized according to their temporal properties. An example of classes that may be considered is presented in Table 2. In further accordance with such an embodiment, it is desirable to promote "very fresh" documents and to demote "outdated documents." Those documents which are "temporally insensitive" or "somewhat fresh" are unlikely to affect the recency of a ranking and so may be left in the original order. These temporal categories can be combined with the relevance judgments using the concept of recency demotion. For example, in accordance with one recency demotion scheme, a shallow demotion is applied if the result is "somewhat outdated" and a deep demotion is applied if the result is "totally outdated." A shallow demotion in the five-grade system described above may comprise a one-grade demotion (e.g., from excellent to good) while a deep demotion in the five-grade system described above may comprise a two-grade demotion (e.g., from excellent to fair). Additional details relating to using a promotion/demotion based system for grading query/URL pairs are provided in the aforementioned U.S. patent application Ser. No. 12/579,855.

TABLE 2

Resource Classes for Time-Sensitive Queries

| resource class | example resource |
|---|---|
| time insensitive | wikipedia entry |
| time sensitive | |
| very fresh | very recent news article |
| somewhat fresh | a day-old news article |
| somewhat outdated | old news article |
| totally outdated | very old news article |

At step 506, content features are calculated for each of the query/Web URL pairs. Content features and various examples thereof were described above in reference to content feature generator 202 of FIG. 2 and content feature generator 302 of FIG. 3 and thus no further explanation will be provided in this section.

At step 508, aggregate features are calculated for each of the query/Web URL pairs. Aggregate features and various examples thereof were described above in reference to aggregate feature generator 204 of FIG. 2 and thus no further explanation will be provided in this section.

At step 510, a machine learned ranker, such as second machine learned ranker 130 of FIG. 1 is trained to perform a ranking function using the grades and content/aggregate features associated with each of the query/Web URL pairs. This step may be symbolically represented as $$M_{regular} \leftarrow \text{TRAIN-MLR}(D_{regular}, \{F_{content}, F_{aggregate}\})$$

wherein $M_{regular}$ is the ranking function and TRAIN-MLR is the learning algorithm, which is based on training set $D_{regular}$ and feature sets $F_{content}$ and $F_{aggregate}$. Training set $D_{regular}$ represents a data set that includes query/Web URL pairs with labeled relevance grades. Feature sets $F_{content}$ and $F_{aggregate}$ represent the content and aggregate features associated with each query/Web URL pair that were generated during steps 506 and 508 respectively.

In one embodiment, a Gradient Boosted Decision Tree (gbdt) algorithm is employed to learn the ranking function. As will be appreciated by persons skilled in the relevant art(s), Gradient Boosted Decision Tree is an additive regression algorithm consisting of an ensemble of trees, fitted to current residuals, gradients of the loss function, in a forward stepwise manner. The algorithm iteratively fits an additive model as $$f_t(x) = T_t(x; \Theta) + \lambda \sum_{t=1}^{T} \beta_t T_t(x; \Theta_t)$$

such that certain loss function $L(y_i, f_T(x+1))$ is minimized, where $T_t(x; \Theta_t)$ is a tree at iteration t, weighted by parameter $\beta$, with a finite number of parameters, $\Theta_t$ and $\lambda$ is the learning rate. At iteration t, tree $T_t(x; \beta)$ is induced to fit the negative gradient by least squares. That is $$\hat{\Theta} := \operatorname{argmin}_\beta \sum_i^N (-G_{it} - \beta_t T_t(x_i; \Theta))^2$$

where $G_{it}$ is the gradient over current prediction function $$G_{it} = \left[ \frac{dL(y_i, f(x_i))}{df(x_i)} \right]_{f=f_{t-1}}$$

The optimal weight of trees $\beta_t$ are determined by $$\beta_t = \operatorname{argmin}_\beta \sum_i^N L(y_i, f_{t-1}(x_i) + \beta T(x_i, \theta))$$

Although the foregoing describes the employment of a Gradient Boosted Decision Tree algorithm to learn a ranking function, persons skilled in the relevant art(s) will readily appreciate that any of a variety of ranking function learning algorithms presently known or hereinafter developed may be used to learn the ranking function.

Figure 6:
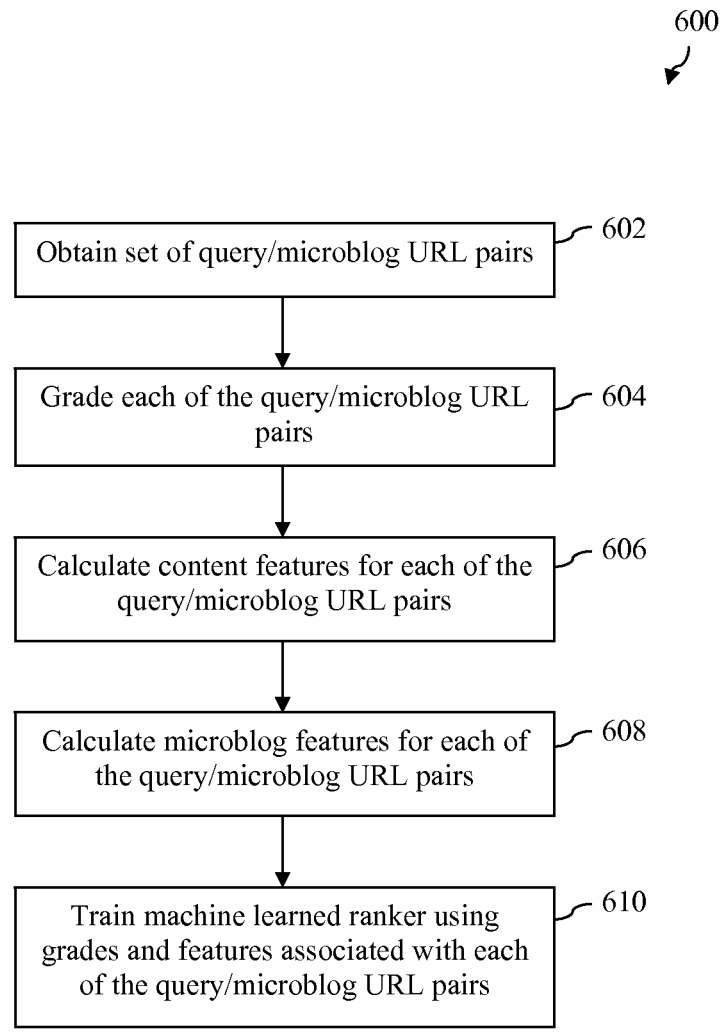
FIG. 6 depicts a flowchart of a second method for training a machine learned ranker used for ranking resources in accordance with an embodiment of the present invention.

FIG. 6 depicts a flowchart 600 of a second method for training a machine learned ranker used for ranking resources in accordance with an embodiment of the present invention. The method of flowchart 600 is particularly suitable for training a machine learned ranker, such as first machine learned ranker 128 of FIG. 1, which is used to rank resources identified by URLs extracted from posts in a microblog data stream, such as the URLs extracted from microblog data stream 120 and stored in microblog URL index 114. Although aspects of the method of flowchart 600 will be described herein with continued reference to system 100 of FIG. 1, persons skilled in the relevant art(s) will appreciate that the method is not limited to that implementation.

As shown in FIG. 6, the method of flowchart 600 begins at step 602 in which a set of query/microblog URL pairs are obtained. Such query/microblog URL pairs may be obtained, for example, by sampling a set of queries submitted to search engine 106 over a predetermined time period and then, for each query so obtained, applying an algorithm to identify microblog URLs indexed in microblog index 112 that are relevant to the query. The algorithm applied may comprise, for example, a simple text-matching algorithm or a machine learned ranking algorithm that analyzes content features associated with query/microblog URL pairs. However, these are only examples and numerous other methods may be used to obtain a suitable set of query/Web URL pairs.

At step 604, each of the query/microblog URL pairs is given a grade by a human editor based on the perceived degree of relevance. In one embodiment, one of five judgment grades may be applied to a query/microblog URL pair: perfect, excellent, good, fair and bad. In a like manner to that described above in reference to step 504 of flowchart 500, the grading scheme may take into account both the perceived temporal and non-temporal relevance of a query/microblog URL pair. For example, a grading promotion and/or demotion scheme may be applied to promote and/or demote resources based on temporal relevance classifications assigned thereto.

At step 606, content features are calculated for each of the query/microblog URL pairs. Content features and various examples thereof were described above in reference to content feature generator 202 of FIG. 2 and content feature generator 302 of FIG. 3 and thus no further explanation will be provided in this section.

At step 608, microblog features are calculated for each of the query/microblog URL pairs. Microblog features and various examples thereof were described above in reference to microblog feature generator 304 of FIG. 3 and in Section B.2. Thus, no further explanation will be provided in this section.

At step 610, a machine learned ranker, such as first machine learned ranker 128 of FIG. 1, is trained to perform a ranking function using the grades and content/microblog features associated with each of the query/microblog URL pairs. This step may be symbolically represented as $$M_{microblog} \leftarrow \text{TRAIN-MLR}(D_{microblog}, \{F_{content}, F_{microblog}\})$$

wherein $M_{microblog}$ is the ranking function and TRAIN-MLR is the learning algorithm, which is based on training set $D_{microblog}$ and feature sets $F_{content}$ and $F_{microblog}$. Training set $D_{microblog}$ represents a data set that includes query/microblog URL pairs with labeled relevance grades. Feature sets $F_{content}$ and $F_{microblog}$ represent the content and microblog features associated with each query/microblog URL pair that were generated during steps 606 and 608 respectively.

In one embodiment, a Gradient Boosted Decision Tree (gbdt) algorithm is employed to learn the ranking function. Such an algorithm was described in detail above in reference to step 510 of flowchart 500. However, persons skilled in the relevant art(s) will readily appreciate that any of a variety of ranking function learning algorithms presently known or hereinafter developed may be used to learn the ranking function.

4. Example Information Retrieval Method

An example information retrieval method will now be described in reference to a flowchart 700 of FIG. 7 and a flowchart 800 of FIG. 8. Although aspects of these methods will be described in herein with continued reference to system 100 of FIG. 1, persons skilled in the relevant art(s) will appreciate that these methods are not limited to that implementation.

As discussed above in reference to system 100 of FIG. 1, to facilitate information retrieval by search engine 106, a Web crawler/indexer 108 operates in a well-known manner to obtain up-to-date information about resources stored on nodes of World Wide Web 104 and to store such information in Web index 112. Also, microblog crawler/indexer 110 identifies URLs included in posts that are received as part of microblog data stream 120 and selectively extracts certain ones of the identified URLs and information associated therewith for indexing in microblog URL index 114.

There are several disadvantages to naively extracting all URLs that are included in the posts within microblog data stream 120. For example, the URLs posted by microblog users may include a significant number of links to spam, adult and self-promotion Web pages. It may be desired to exclude such resources from the ranking results. Additionally, performing real-time crawling and indexing of all the URLs that are included in the posts within microblog data stream 120 may require considerable resource overhead.

In order to address this, an embodiment of the present invention employs simple heuristics to filter out certain undesired microblog URLs. For example, in one embodiment, if a URL is referred to by the same microblog user more than two times over a predetermined time period, the URL is discarded (i.e., not indexed). It is assumed that such URLs constitute links to spam or self-promotion pages. Additionally, if a URL is only referred to by one microblog user over a predetermined time period, the URL is discarded because it is not popular in the microblog.

Figure 7:
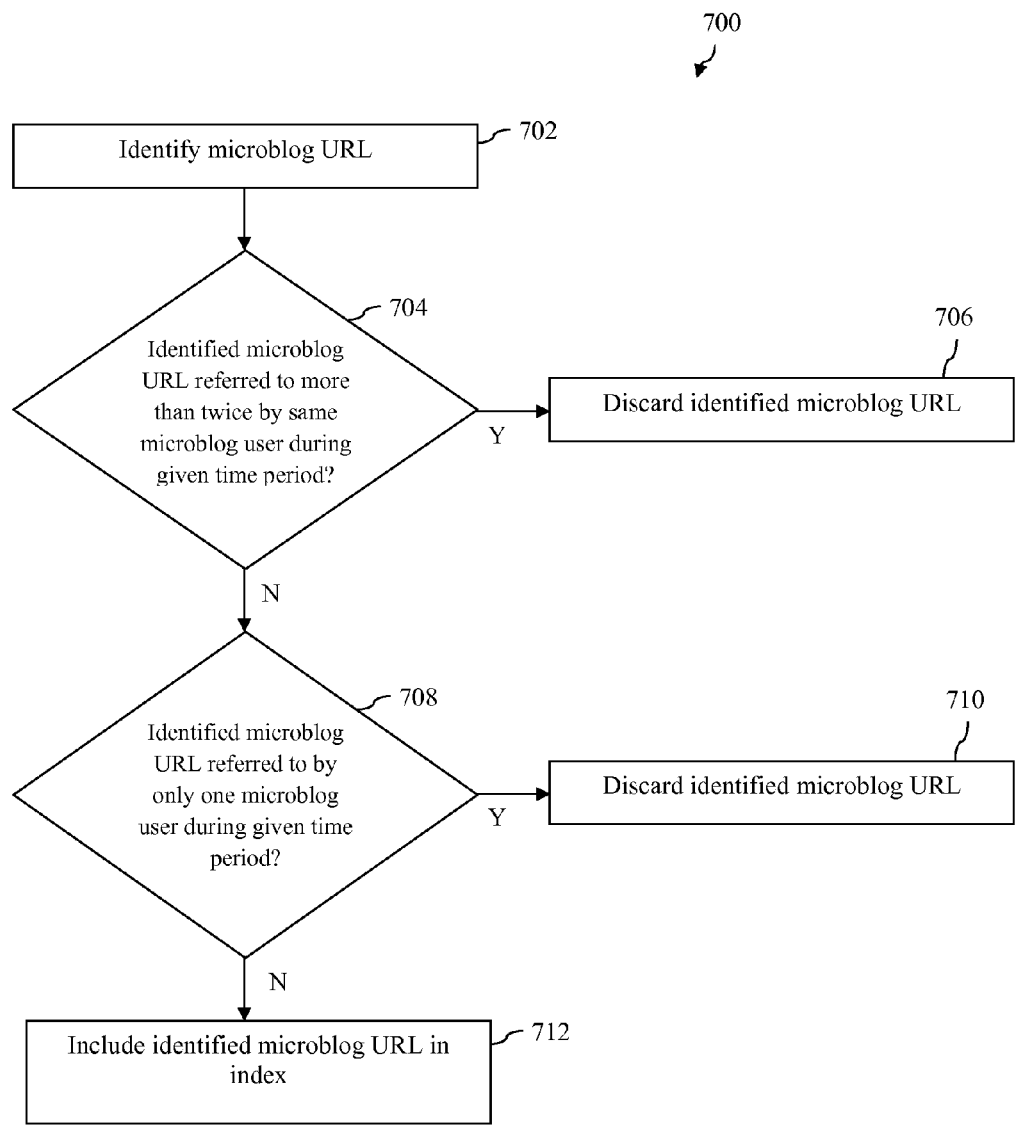
FIG. 7 depicts a flowchart of a method for selectively indexing microblog URLs in accordance with an embodiment of the present invention.

FIG. 7 depicts a flowchart 700 of a method for selectively indexing microblog URLs in accordance with the foregoing approach. The method of flowchart 700 may be implemented, for example, by microblog crawler/indexer 110 of system 100 as described above in reference to FIG. 1.

As shown in FIG. 7, the method of flowchart 700 begins at step 702 in which a microblog URL is identified. The microblog URL may be identified, for example, by detecting the microblog URL within a post included within microblog data stream 120.

At decision step 704, it is determined whether the microblog URL identified in step 702 was referred to more than twice by the same microblog user during a given time period. If it is determined that the identified microblog URL was referred to more than twice by the same microblog user during the given time period, then the identified microblog URL is discarded as shown at step 706.

However, if it is determined during decision step 704 that the identified microblog URL was not referred to more than twice by the same microblog user during the given time period, then control flows to decision step 708. At decision step 708, it is determined whether the microblog URL identified in step 702 was referred to by only one microblog user during a given time period. If it is determined that the identified microblog URL was referred to by only one microblog user during the given time period, then the identified microblog URL is discarded as shown at step 710.

However, if it is determined during decision step 708 that the identified microblog URL was not referred to by only one microblog user during the given time period (i.e., the identified microblog URL was referred to by two or more microblog users during the given time period), then control flows to step 712, in which the identified microblog URL is included in a microblog URL index, such as microblog URL index 114 discussed above in reference to system 100 of FIG. 1. This step may also include storing information associated with the microblog URL in the index, such as, for example, the text of posts that include or refer to the URL and/or metadata associated with each such post.

The foregoing is only one example of a manner by which microblog URLs may be selectively indexed in accordance with an embodiment of the present invention. Based on the teachings provided herein, persons skilled in the relevant art(s) will appreciate that a variety of other filters may be applied to selectively index microblog URLs extracted from microblog data stream 120.

Figure 8:
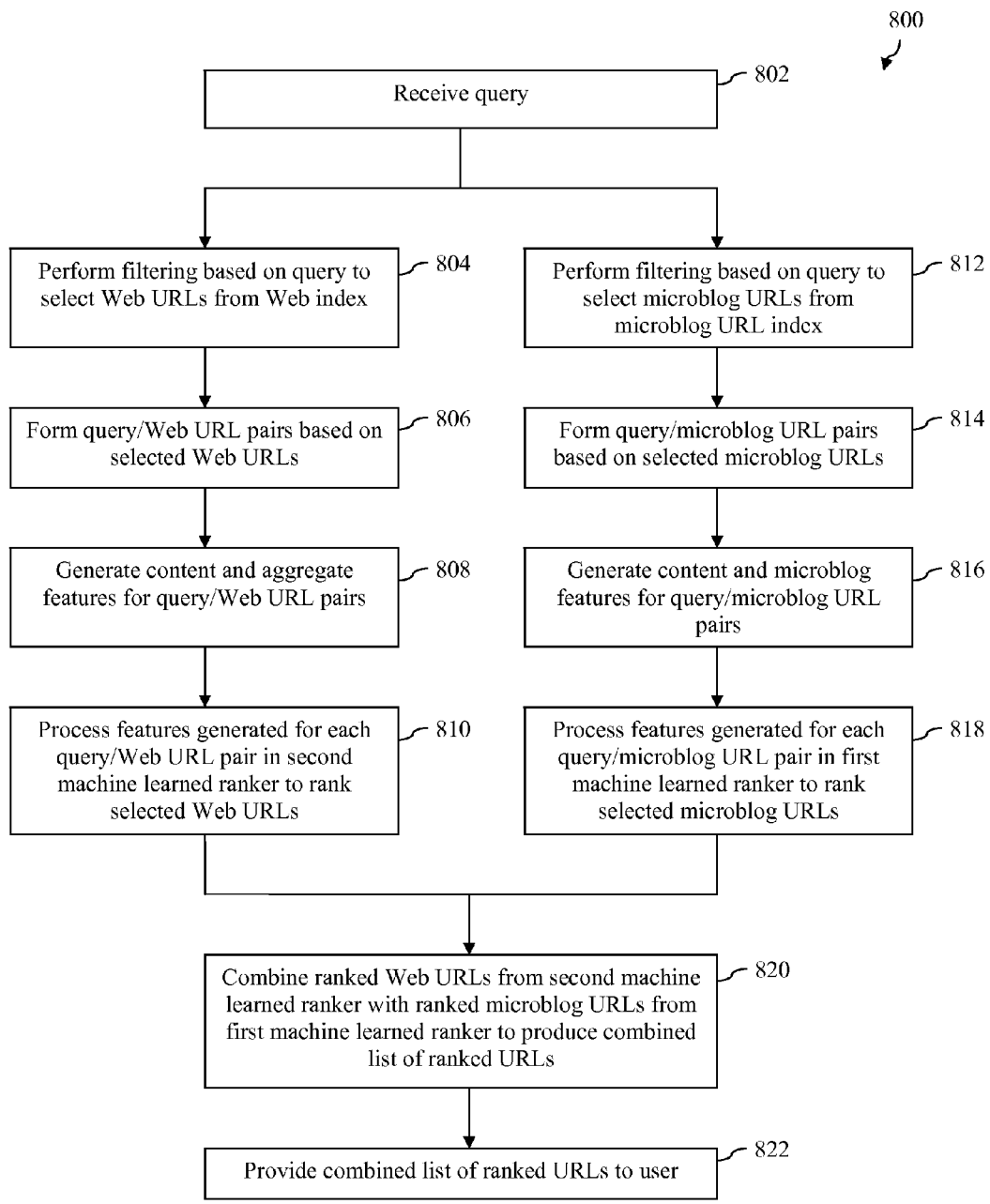
FIG. 8 depicts a flowchart of a method for generating a ranked list of resources in response to a query in accordance with an embodiment of the present invention.

FIG. 8 depicts a method for generating a ranked list of resources in response to a query in accordance with an embodiment of the present invention. As shown in FIG. 8, the method of flowchart 800 begins at step 802 in which a query is received. The query may be received, for example, from a user such as a user of user computer 102 as described above in reference to system 100 of FIG. 1.

As shown in FIG. 8, responsive to the receipt of the query in step 802, two sets of steps are performed—namely, a first set of steps that includes steps 804, 806, 808 and 810 and a second set of steps that includes steps 812, 814, 816 and 818. The arrangement of these steps in FIG. 8 is not intended to indicate that any timing constraints have been imposed with respect to when such steps are performed except that step 820 will not performed until both the first set of steps and the second set of steps have completed. In certain embodiments, however, the first set of steps may be performed substantially in parallel with the second set of steps.

As noted above, the first set of steps includes steps 804, 806, 808 and 810. During step 804, a filtering operation is performed based on the query received during step 802 to select Web URLs from a Web index. For example, this step may be performed by Web URL filter 122 of system 100 by employing a matching algorithm to identify resources indexed in Web index 112 that are relevant to the query.

At step 806, query/Web URL pairs are formed by combining the query received during step 802 with each of the Web URLs that were selected during step 804. In one embodiment, this step is performed by Web URL filter 122 of system 100.

At step 808, content and aggregate features are generated for each of the query/Web URL pairs formed during step 806. Various types of content and aggregate features that may be generated in accordance with this step were previously described. This step may be performed, for example, by second feature generator 126 of system 100.

At step 810, the content and aggregate features generated for each query/Web URL pair during step 808 are processed in a second machine learned ranker to rank the selected Web URLs in each pair. This step may be performed, for example, by second machine learned ranker 130 of system 100. This step produces a ranked list of Web URLs.

As also noted above, the second set of steps includes steps 812, 814, 816 and 818. During step 812, a filtering operation is performed based on the query received during step 802 to select URLs indexed in a microblog URL index that are relevant to the query. For example, this step may be performed by microblog URL filter 120 of system 100 by employing a matching algorithm to select URLs indexed in microblog URL index 114 that are relevant to the query.

At step 814, query/microblog URL pairs are formed by combining the query received during step 802 with each of the microblog URLs that were selected during step 812. In one embodiment, this step is performed by microblog URL filter 120 of system 100.

At step 816, content and microblog features are generated for each of the query/microblog URL pairs formed during step 814. Various types of content and microblog features that may be generated in accordance with this step were previously described. This step may be performed, for example, by first feature generator 124 of system 100.

At step 818, the content and microblog features generated for each query/microblog URL pair during step 816 are processed in a first machine learned ranker to rank the selected microblog URLs in each pair. This step may be performed, for example, by first machine learned ranker 128 of system 100. This step produces a ranked list of microblog URLs.

At step 820, the ranked list of Web URLs produced by the second machine learned ranker during step 810 and the ranked list of microblog URLs produced by the first machine learned ranker during step 818 are combined to produce a combined list of ranked URLs. To facilitate this step, the first machine learned ranker and the second machine learned ranker may be configured to utilize the same relevancy scoring metric such that a simple sorting routine can be used to combine the ranked listings. Alternatively, the ranking scores associated with microblog URLs may be calibrated onto the ranking scores associated with Web URLs, or vice versa, to achieve URL blending. The combined list of ranked URLs may then be used to generate a set of ranked search results that may be returned to the entity that submitted the query during step 802 as shown in step 822. In one embodiment, step 820 is performed by ranked URL combiner 132 of system 100.

B. Alternative System and Method Implementations

An example information retrieval system that uses microblog data to identify and rank resources, as well as methods that may be performed by such a system, were described above. However, various alternative systems and methods may be implemented that also utilize microblog data to identify and rank resources. Some of these alternative systems and methods will be described below.

System 100 as described above obtains a real-time microblog data stream from a microblog publication system and also crawls a microblog subscription system to obtain information concerning users of the microblog. In alternative embodiments, such microblog-related information may be received from other sources and via other communication channels than those described in reference to system 100.

System 100 as described above performs feature generation based on query/URL pairs produced by a Web URL filter 122 and a microblog URL filter 120. In an alternate embodiment, feature generation (or a portion thereof) can be performed prior to the performance of Web URL filtering by Web URL filter 122 and/or the performance of microblog URL filtering by microblog URL filter 120. In this way, certain features may be used by Web URL filter 122 and/or microblog URL filter 120 to perform respective filtering functions. In a particular example, query/microblog URL pairs are obtained by combining query 116 with each microblog URL in microblog URL index 114 and content features are generated for each pair. Microblog URL filter 122 may then apply a ranking function that is trained using such content features to the query/microblog URL pairs to heuristically determine a ranking score threshold. If a query/microblog URL pair has a higher ranking score than this threshold, then the pair is passed on for further processing; otherwise, the pair is discarded.

System 100 as described above operates to identify and rank resources included both in a Web index and in a microblog URL index to produce a combined ranked list of resources. An alternate embodiment of the present invention may be used to identify and rank only resources that are included in a microblog URL index. For example, a search engine in accordance with such an embodiment may include components that perform functions similar to those performed by microblog URL filter 120, first feature generator 124 and first machine learned ranker 128 to produce a ranked listing of microblog URLs only.

Features of the present invention as described above may be used to improve search engine performance both for general search queries as well as recency-sensitive queries. For example, the performance of a system that provides specialized handling of recency-sensitive queries such as that described in commonly-owned, co-pending U.S. patent application Ser. No. 12/579,855 to Anlei Dong et al., entitled "Incorporating Recency in Network Search Using Machine Learning" and filed on Oct. 15, 2009 (the entirety of which is incorporated by reference herein) may be improved by including microblog URLs in the search results for recency-sensitive queries and by incorporating microblog features into the ranking scheme used when processing such queries.

The aforementioned U.S. patent application Ser. No. 12/579,855 describes an information retrieval system that determines whether a query is recency-sensitive. If the query is determined to be recency-sensitive, then resources identified in response to the query are ranked using a recency ranking algorithm; otherwise, the resources identified in response to the query are ranked using a relevancy ranking algorithm. In accordance with the present invention, the system could be extended in various manners. For example, the resources that are searched could be extended to include microblog URLs responsive to determining that the query is recency-sensitive. Additionally, the features that are considered in applying the recency ranking algorithm could be extended to include microblog features such as those described elsewhere herein.

C. Example Processor-Based Implementation

User computer 102, any of the components of search engine 106, Web crawler/indexer 108, microblog crawler/indexer 110, and certain steps of flowcharts 400, 500, 600, 700 and 800 may be implemented by one or more processor-based devices or systems. An example of such a system 900 is depicted in FIG. 9.

Figure 9:
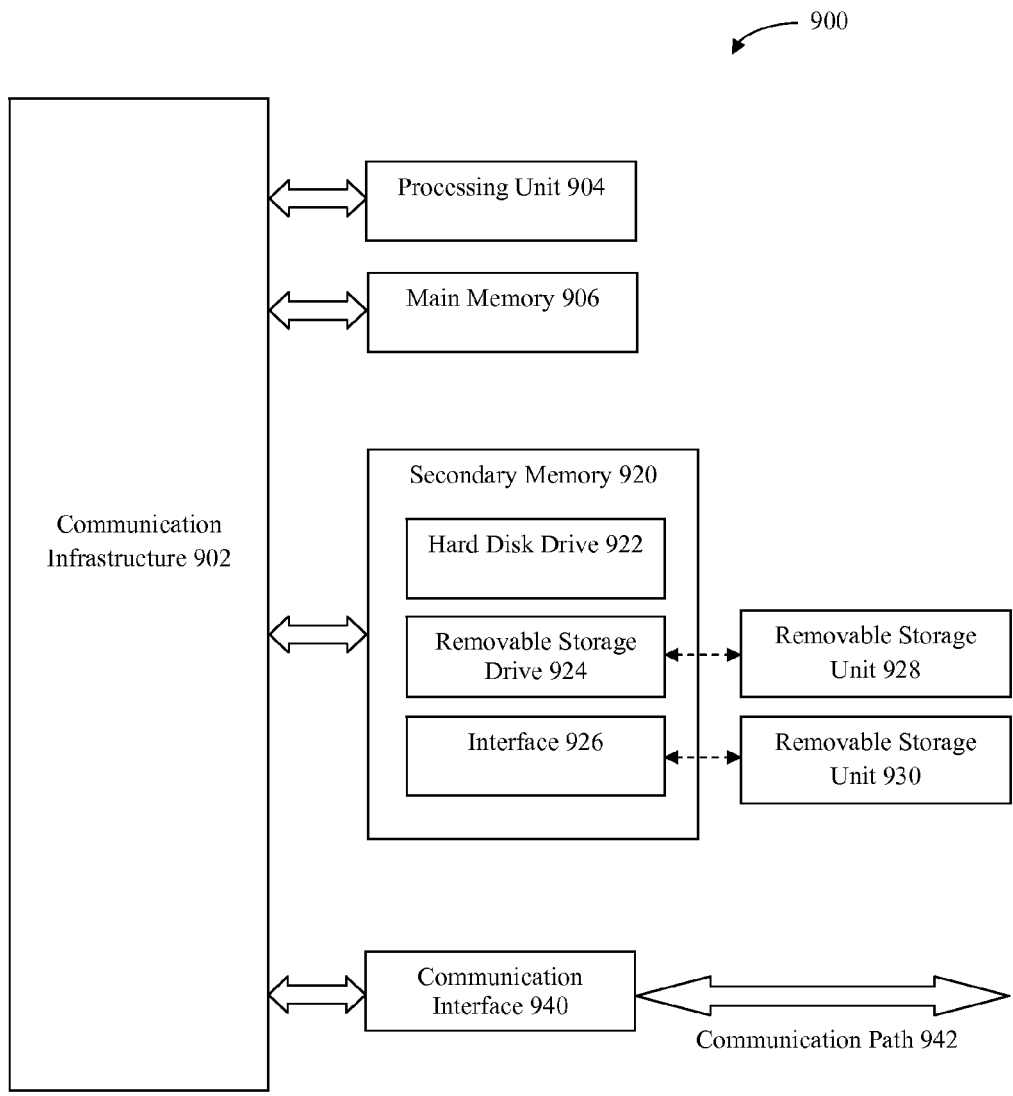
FIG. 9 is a block diagram of a computer system that may be used to implement one or more aspects of the present invention.

As shown in FIG. 9, system 900 includes a processing unit 904 that includes one or more processors or processor cores. Processor unit 904 is connected to a communication infrastructure 902, which may comprise, for example, a bus or a network.

System 900 also includes a main memory 906, preferably random access memory (RAM), and may also include a secondary memory 920. Secondary memory 920 may include, for example, a hard disk drive 922, a removable storage drive 924, and/or a memory stick. Removable storage drive 924 may comprise a floppy disk drive, a magnetic tape drive, an optical disk drive, a flash memory, or the like. Removable storage drive 924 reads from and/or writes to a removable storage unit 928 in a well-known manner Removable storage unit 928 may comprise a floppy disk, magnetic tape, optical disk, or the like, which is read by and written to by removable storage drive 924. As will be appreciated by persons skilled in the relevant art(s), removable storage unit 928 includes a computer usable storage medium having stored therein computer software and/or data.

In alternative implementations, secondary memory 920 may include other similar means for allowing computer programs or other instructions to be loaded into system 900. Such means may include, for example, a removable storage unit 930 and an interface 926. Examples of such means may include a program cartridge and cartridge interface (such as that found in video game devices), a removable memory chip (such as an EPROM, or PROM) and associated socket, and other removable storage units 930 and interfaces 926 which allow software and data to be transferred from removable storage unit 930 to system 900.

System 900 may also include a communication interface 940. Communication interface 940 allows software and data to be transferred between system 900 and external devices. Examples of communication interface 940 may include a modem, a network interface (such as an Ethernet card), a communications port, a PCMCIA slot and card, or the like. Software and data transferred via communication interface 940 are in the form of signals which may be electronic, electromagnetic, optical, or other signals capable of being received by communication interface 940. These signals are provided to communication interface 940 via a communication path 942. Communications path 942 carries signals and may be implemented using wire or cable, fiber optics, a phone line, a cellular phone link, an RF link and other communications channels.

As used herein, the terms "computer program medium" and "computer readable medium" are used to generally refer to media such as removable storage unit 928, removable storage unit 930 and a hard disk installed in hard disk drive 922. Computer program medium and computer readable medium can also refer to memories, such as main memory 906 and secondary memory 920, which can be semiconductor devices (e.g., DRAMs, etc.). These computer program products are means for providing software to system 900.

Computer programs (also called computer control logic, programming logic, or logic) are stored in main memory 906 and/or secondary memory 920. Computer programs may also be received via communication interface 940. Such computer programs, when executed, enable system 900 to implement features of the present invention as discussed herein. Accordingly, such computer programs represent controllers of the computer system 900. Where an aspect of the invention is implemented using software, the software may be stored in a computer program product and loaded into system 900 using removable storage drive 924, interface 926, or communication interface 940.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

D. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for generating a ranked list of resources in response to a query, comprising:
pairing the query with a plurality of microblog resource identifiers, wherein each microblog resource identifier comprises a resource identifier obtained from monitoring a received data stream of microblog posts, thereby generating a plurality of query/microblog resource identifier pairs;
generating a feature set for each query/microblog resource identifier pair, wherein generating the feature set includes generating at least one textual feature by analyzing text of one or more microblog posts that refer to the microblog resource identifier in conjunction with text of the query or generating at least one social networking feature by analyzing one or more characteristics associated with one or more microblog users that issued or received the microblog resource identifier via the microblog;
processing the feature sets associated with each query/microblog resource identifier pair in a first machine learned ranker to produce a ranking for each microblog resource identifier; and
generating one single combined ranked list of resources by combining the rankings for each microblog resource identifier produced by the first machine learned ranker with rankings generated for a plurality of network resource identifiers, wherein each network resource identifier comprises a resource identifier obtained from resources other than the received data stream of microblog posts.

2. The method of claim 1, wherein generating the at least one textual feature by analyzing the text of the one or more microblog posts that refer to the microblog resource identifier in conjunction with the text of the query comprises:
constructing a term vector for the microblog resource identifier based on terms used in the one or more microblog posts that refer to the microblog resource identifier;
constructing a term vector for the query based on terms used in the query; and
calculating a cosine similarity between the term vector for the microblog resource identifier and the term vector for the query.

3. The method of claim 1, wherein generating the at least one textual feature by analyzing the text of the one or more microblog posts that refer to the microblog resource identifier in conjunction with the text of the query comprises:
calculating a measure of term overlap between terms used in the one or more microblog posts that refer to the microblog resource identifier and terms used in the query.

4. The method of claim 1, wherein generating the at least one textual feature by analyzing the text of the one or more microblog posts that refer to the microblog resource identifier in conjunction with the text of the query comprises:
counting a number of microblog posts that refer to the microblog resource identifier in which all query tokens appear contiguously and in the same order.

5. The method of claim 1, wherein generating the at least one social networking feature by analyzing one or more characteristics associated with one or more microblog users that issued or received the microblog resource identifier via the microblog comprises:
calculating a measure of authority of a microblog user that issued the microblog resource identifier via the microblog based on an analysis of follower and following relationships between microblog users.

6. The method of claim 1, wherein generating the at least one social networking feature by analyzing one or more characteristics associated with one or more microblog users that issued or received the microblog resource identifier via the microblog comprises performing one or more of:
calculating an average number of microblog users that are following microblog users that issued the microblog resource identifier;
calculating an average number of microblog users that re-issued the microblog resource identifier after receiving the microblog resource identifier;
calculating a number of microblog users that re-issued the microblog resource identifier to a microblog user that issued the microblog resource identifier and is determined to have a maximal authoritative rank; and calculating a number of microblog users that are following a microblog user that issued the microblog resource identifier and is determined to have a maximal authoritative rank.

7. The method of claim 1, wherein generating the feature set for each query/microblog resource identifier pair further comprises generating content features based on analyzing content of a resource identified by the microblog resource identifier in conjunction with the text of the query.

8. The method of claim 1, wherein combining the rankings for each microblog resource identifier produced by the first machine learned ranker with rankings generated for a plurality of network resource identifiers comprises:

pairing the query with the plurality of network resource identifiers, thereby generating a plurality of query/network resource identifier pairs;

generating a feature set for each query/network resource identifier pair; and processing the feature sets associated with each query/network resource identifier pair in a second machine learned ranker to produce the ranking for each network resource identifier.

9. The method of claim 8, wherein generating the feature set for each query/network resource identifier pair comprises:

generating at least one content feature based on analyzing content of a resource identified by the network resource identifier in conjunction with the text of the query and generating at least one aggregate feature based on analyzing popularity and/or usage characteristics of the resource identified by the network resource identifier.

10. An information retrieval system, comprising:

one or more processing units;

a microblog URL filter configured for pairing a query with a plurality of microblog resource identifiers, wherein each microblog resource identifier comprises a resource identifier obtained from monitoring a received data stream of microblog posts, thereby generating a plurality of query/microblog resource identifier pairs;

a first feature generator, at least partially executed by at least one of the one or more processing units, configured for generating a feature set for each query/microblog resource identifier pair, wherein generating the feature set includes generating at least one textual feature by analyzing text of one or more microblog posts that refer to the microblog resource identifier in conjunction with text of the query or generating at least one social networking feature by analyzing one or more characteristics associated with one or more microblog users that issued or received the microblog resource identifier via the microblog;

a first machine learned ranker configured for processing the feature sets associated with each query/microblog resource identifier pair to produce a ranking for each microblog resource identifier; and a ranked resource identifier combiner configured for generating one single combined ranked list of resources by combining the rankings for each microblog resource identifier produced by the first machine learned ranker with rankings generated for a plurality of network resource identifiers, wherein each network resource identifier comprises a resource identifier obtained from resources other than the received data stream of microblog posts.

11. The system of claim 10, wherein the first feature generator generates a textual feature for a query/microblog resource identifier pair by constructing a term vector for the microblog resource identifier based on terms used in one or more microblog posts that refer to the microblog resource identifier, constructing a term vector for the query based on terms used in the query, and calculating a cosine similarity between the term vector for the microblog resource identifier and the term vector for the query.

12. The system of claim 10, wherein the first feature generator generates a textual feature for a query/microblog resource identifier pair by calculating a measure of term overlap between terms used in one or more microblog posts that refer to the microblog resource identifier and terms used in the query.

13. The system of claim 10, wherein the first feature generator generates a textual feature for a query/microblog resource identifier pair by counting a number of microblog posts that refer to the microblog resource identifier in which all query tokens appear contiguously and in the same order.

14. The system of claim 10, wherein the first feature generator generates a social networking feature for a query/microblog resource identifier pair by calculating a measure of authority of a microblog user that issued the microblog resource identifier via the microblog based on an analysis of follower and following relationships between microblog users.

15. The system of claim 10, wherein the first feature generator generates social networking features for a query/microblog resource identifier pair by performing one or more of the following:

calculating an average number of microblog users that are following microblog users that issued the microblog resource identifier;

calculating an average number of microblog users that re-issued the microblog resource identifier after receiving the microblog resource identifier;

calculating a number of microblog users that re-issued the microblog resource identifier to a microblog user that issued the microblog resource identifier and is determined to have a maximal authoritative rank; and calculating a number of microblog users that are following a microblog user that issued the microblog resource identifier and is determined to have a maximal authoritative rank.

16. The system of claim 10, wherein the first feature generator generates content features for each query/microblog resource identifier pair by analyzing content of a resource identified by the microblog resource identifier in conjunction with the text of the query.

17. The system of claim 10, further comprising:

a network resource identifier filter that pairs the query with the plurality of network resource identifiers, thereby generating a plurality of query/network resource identifier pairs;

a second feature generator that generates a feature set for each query/network resource identifier pair; and a second machine learned ranker that processes the feature sets associated with each query/network resource identifier pair to produce the ranking for each network resource identifier.

18. The system of claim 17, wherein the second feature generator generates the feature set for each query/network resource identifier pair by generating at least one content feature based on analyzing content of a resource identified by the network resource identifier in conjunction with the text of the query and generating at least one aggregate feature based on analyzing popularity and/or usage characteristics of the resource identified by the network resource identifier.

19. A method for identifying resources in response to a query received from a user, comprising:
- storing resource identifiers extracted from a data stream of microblog posts in a microblog resource identifier index;
- determining whether the query is a recency-sensitive query;
- responsive to determining that the query is a recency-sensitive query, including resources identified by the resource identifiers in the microblog resource identifier index among resources to be searched based on the query;
- identifying resources among the resources to be searched based on the query;
- ranking the identified resources; and
- providing one single combined list of the identified resources to the user, wherein the one single combined list is ordered based on the ranking and at least one other ranking generated for a plurality of network resource identifiers, wherein each network resource identifier comprises a resource identifier obtained from resources other than the received data stream of microblog posts.

20. The method of claim 19, wherein ranking the identified resources comprises:
- ranking a resource identified by a resource identifier in the microblog resource identifier index based on at least one textual feature generated by analyzing text of one or more microblog posts that refer to the microblog resource identifier in conjunction with text of the query or generating at least one social networking feature by analyzing one or more characteristics associated with one or more microblog users that issued or received the microblog resource identifier via the microblog.

21. A method for identifying and ranking resources in response to a query received from a user comprising:
- selecting a first group of resources from among a plurality of resources represented in a first index based on the query, wherein the first index is created by crawling a network of nodes that store resources;
- ranking the first group of resources to generate a first ranked list of resources;
- selecting a second group of resources from among a plurality of resources represented in a second index based on the query, wherein the second index is created by monitoring a received data stream of microblog posts to identify resource identifiers included in the microblog posts, and the second group of resources are different from the first group of resources;
- ranking the second group of resources to generate a second ranked list of resources;
- combining the first and second ranked list of resources to generate one single combined ranked list of resources; and
- returning the one single combined ranked list of resources to the user.

22. The method for claim 1, wherein resources in the one single combined ranked list are ranked based on a metric utilized by the first machine learned ranker.

* * * * *